United States Patent

Davis, Jr. et al.

[11] Patent Number: 6,069,319
[45] Date of Patent: May 30, 2000

[54] FOAMED-IN HARNESSES

[75] Inventors: Joseph J. Davis, Jr., Ortonville; David C. Pudduck; Timothy F. O'Brien, both of White Lake, all of Mich.

[73] Assignee: Lear Automotive Dearborn, Inc., Dearborn, Mich.

[21] Appl. No.: 08/898,663

[22] Filed: Jul. 22, 1997

[51] Int. Cl.[7] ....................................... H01B 3/00
[52] U.S. Cl. ................. 174/72 A; 174/77 R; 174/110 F; 361/826; 264/46.4; 439/503
[58] Field of Search ............................. 174/70 R, 71 R, 174/72 R, 72 A, 72 C, 72 TR, 77 R, 110 F; 361/826; 307/149; 439/502, 503, 623, 624; 29/825, 857, 868; 264/46.4, 46.5; 156/47

[56] References Cited

U.S. PATENT DOCUMENTS

| | | | |
|---|---|---|---|
| 3,740,454 | 6/1973 | Arndt et al. | 174/101.5 |
| 3,946,768 | 3/1976 | Fiorentino | 140/92.1 |
| 3,985,951 | 10/1976 | Harris | 174/138 F |
| 4,270,961 | 6/1981 | Faranetta et al. | 156/51 |
| 4,304,713 | 12/1981 | Perelman | 264/45.9 |
| 4,330,685 | 5/1982 | Bleikamp, Jr. | 174/101.5 |
| 4,360,241 | 11/1982 | Fukunaga | 439/34 |
| 4,444,705 | 4/1984 | Kumasaka et al. | 264/46.5 |
| 4,653,155 | 3/1987 | Hara | 24/16 PB |
| 4,923,537 | 5/1990 | Matsushima | 156/48 |
| 4,942,499 | 7/1990 | Shibata et al. | 361/826 |
| 4,943,241 | 7/1990 | Watanabe et al. | 439/34 |
| 5,030,116 | 7/1991 | Sakai et al. | 439/130 |
| 5,082,253 | 1/1992 | Suzuki et al. | 269/45 |
| 5,168,124 | 12/1992 | Takase et al. | 174/23 R |
| 5,210,377 | 5/1993 | Kennedy et al. | 174/107 |
| 5,230,146 | 7/1993 | Tsuji et al. | 29/861 |
| 5,324,203 | 6/1994 | Sano et al. | 174/34 |
| 5,338,014 | 8/1994 | Kitamura | 269/47 |
| 5,355,787 | 10/1994 | Burns et al. | 100/27 |
| 5,367,126 | 11/1994 | Kikuchi | 428/71 R |
| 5,403,977 | 4/1995 | Steptoe et al. | 174/77 R |
| 5,442,518 | 8/1995 | Beam | 361/690 |
| 5,447,789 | 9/1995 | Griffin | 43/308.4 |
| 5,490,664 | 2/1996 | Justus et al. | 269/66 |
| 5,500,179 | 3/1996 | Onishi et al. | 264/400 |
| 5,535,511 | 7/1996 | Karasik | 29/872 |
| 5,676,552 | 10/1997 | Fukuda et al. | 439/34 |
| 5,688,135 | 11/1997 | Gallagher, Sr. | 439/124 |

FOREIGN PATENT DOCUMENTS

| | | |
|---|---|---|
| 0036141 | of 1981 | European Pat. Off. . |
| 0235924 | of 1987 | European Pat. Off. . |
| 0274240 | of 1987 | European Pat. Off. . |
| 0284488 | of 1988 | European Pat. Off. . |
| 0418882 | of 1990 | European Pat. Off. . |
| 0555811 | of 1993 | European Pat. Off. . |
| 5114310 | of 1993 | European Pat. Off. . |
| 0666172 | of 1995 | European Pat. Off. . |
| 0709252 | of 1995 | European Pat. Off. . |
| 9150460 | of 1997 | European Pat. Off. . |
| 2740422 | of 1995 | France . |
| 4212207 | of 1992 | Germany . |
| 9628850 | of 1996 | Germany . |
| WO9627926 | of 1996 | Germany . |
| 2268837 | 1/1994 | United Kingdom ................. 174/72 C |
| WO9318565 | of 1993 | WIPO . |

*Primary Examiner*—Kristine Kincaid
*Assistant Examiner*—Dhiru R Patel
*Attorney, Agent, or Firm*—Brooks & Kushman P.C.

[57] ABSTRACT

A wire harness for use on contoured, mounting surface includes individual wires bundled together. In an effort to protect these wires from mechanical wear, vibration, and water the wire harness is encased in foam. The foam is molded about the wire harness so that is surrounds the harness in the shape of the mounting surface. The foamed-in wire harness may have an elastic memory, so that it can be bent and resiliently recover to its molded shape.

28 Claims, 2 Drawing Sheets

FOAMED-IN HARNESSES

TECHNICAL FIELD

The present invention relates to wire harnesses, and more particularly to a method of molding foam around a wire harness and foamed-in wire harnesses formed therefrom.

BACKGROUND OF THE INVENTION

Wire harnesses are large bundles of wire used to interconnect the electrical components of a vehicle to their respective controls and power source. Generally, the wire harnesses are branched to resemble a tree having a central trunk and extending limbs. The individual wires terminate in either male or female electrical terminals. In addition, wire harnesses include connectors. Connectors serve two functions within the wire harness. First, mated connectors securely hold a male terminal in electrical contact with a female terminal, so that electric current may pass through the associated wire and perform various functions. Second, since the terminal environment includes corrosive chemicals, flying objects, and high temperatures, that might damage them, it is industry practice to protect them with connectors.

During assembly of wire harnesses the wire bundles are held together through the process of wrapping tape around an outer periphery of the bundled wires at spaced locations. Typically, for automobile instrument panel wire harnesses, the bundles are inserted in and taped to plastic troughs. The troughs containing the wire harnesses are fastened to the instrument panel, and assist in locating the wire harnesses on the instrument panel. The branches of the wire harness are routed along the instrument panel at various locations and held thereto with conventional fasteners, such as Christmas tree fasteners.

Wire harness installation must satisfy several requirements during vehicle operation. First, a wire harness may vibrate, so it must be resistant to mechanical wear in critical areas. Inserting bundled wires into corrugated, convoluted plastic tubes, braided sleeves, or the like minimizes mechanical wear in critical areas. Secondly, noise due to vibration of the wire harness must be minimized. Wrapping and taping foam sheets about the bundles in areas prone to cause noises dampens possible noises. Using gaskets with the fasteners that attach the harnesses helps minimize a loose fit of the fastener to the instrument panel. Thus, the fasteners do not rattle. Thirdly, the wire harness must not allow water to enter or pass through the instrument panel. In order to prevent water leakage, certain branches of the wire harness are fitted with rubber gaskets. Currently, the amount and cost of the protective material necessary for each wire harness, increases the cost of wire harnesses substantially.

Assembly of the wire harness to the instrument panel is a manually intensive process, as the various protective devices must be connected to the vulnerable sections of the wire harness, the trough must be connected to the instrument panel, and the harness must be located along the contoured surface of the instrument panel using conventional fasteners. This process requires that the wire harness branches be bent and held by a worker in the proper location during attachment. The intensive labor necessary for this processes increases the cost of wire harnesses substantially. In the automotive and other industries, minimizing costs is desirable.

Therefore, a method is sought for bundling the wires together which satisfies the operating requirements and protects them from various environmental hazards. It is desired that this method reduces the cost of protecting the wire harnesses and allows for automation of the wire harness bundling, and minimizes the labor necessary to install the wire harnesses.

SUMMARY

According to an embodiment of the present invention, a method for forming a wire harness includes shaping a cavity of a mold to approximate a mounting surface. The wire harness is installed in the cavity. The wire harness is surrounded by a foam. The foam is cured around the wire harness. Thus, the foam encases the wire harness in a desired shape, and protects it from mechanical wear, vibration, and water. In one embodiment the foam preferred is a memory retaining foam.

According to another embodiment of the present invention, a wire harness adapted to be mounted adjacent a contoured surface includes a wire bundle and a foam sheath encasing the bundle. The sheath has a molded shape which matches the shape of the contoured surface. The sheath further has an elastic memory of the molded shape, rendering the sheath highly deformable and resilient to allow the sheath to be bent and to thereafter resiliently recover to the molded shape.

The foregoing invention will become more apparent in the following detailed description of the best mode for carrying out the invention and in the accompanying drawings.

BEST MODE FOR CARRYING OUT AN EMBODIMENT THE INVENTION

Figure 1:
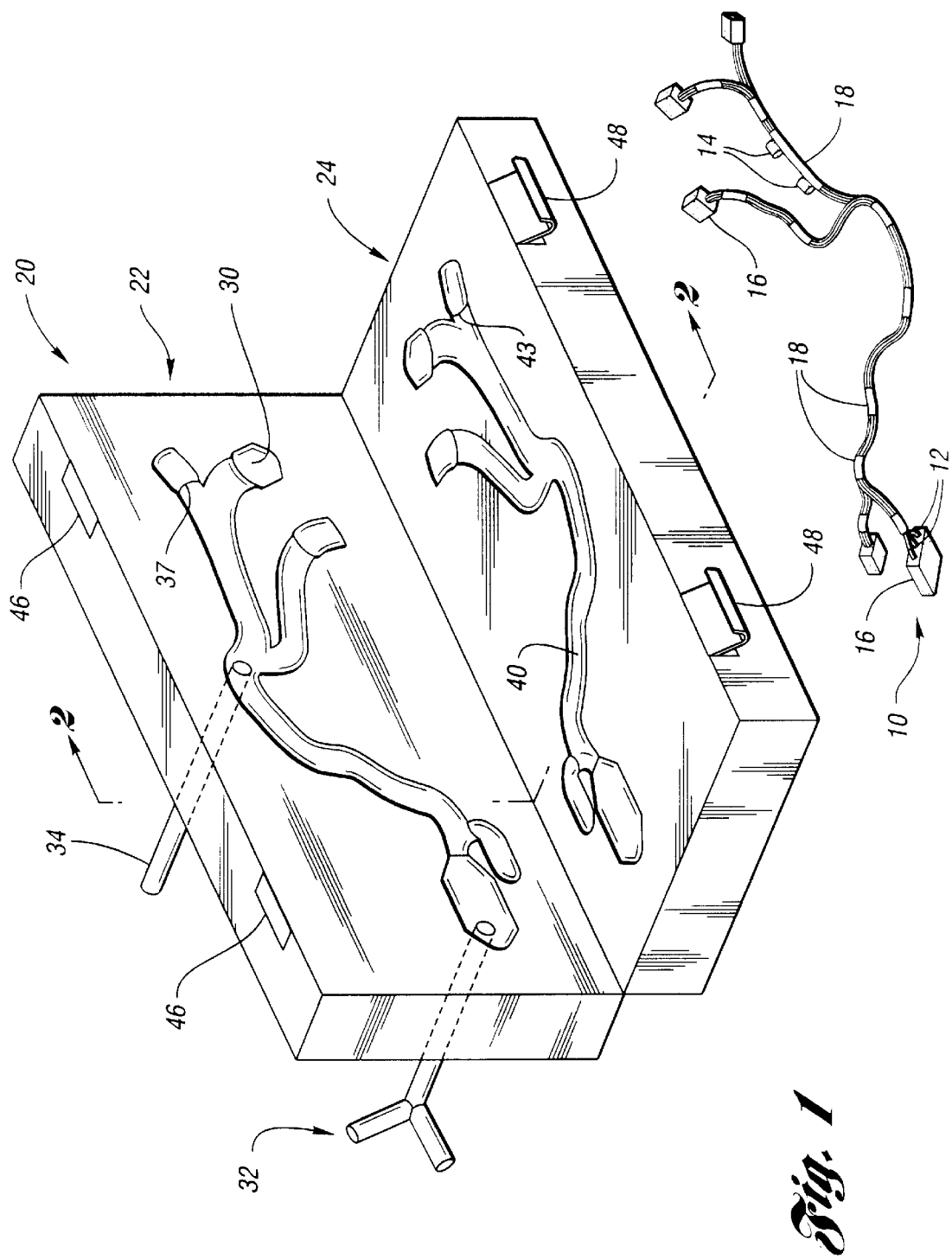
FIG. 1 is a perspective view of a wire harness and a mold for foaming around the wire harness, where the mold is in an open position.

Referring to FIG. 1, a wire harness 10 includes individual wires 12, fasteners 14, and connectors 16. The wires 12 are bundled together with tape 18 at various spaced locations. The tape 18 also secures the fasteners 14 to the bundles at various locations. The individual wires 12 each include terminals (not shown) at each end. Groups of terminals are housed by each of the connectors 16.

Figure 2:
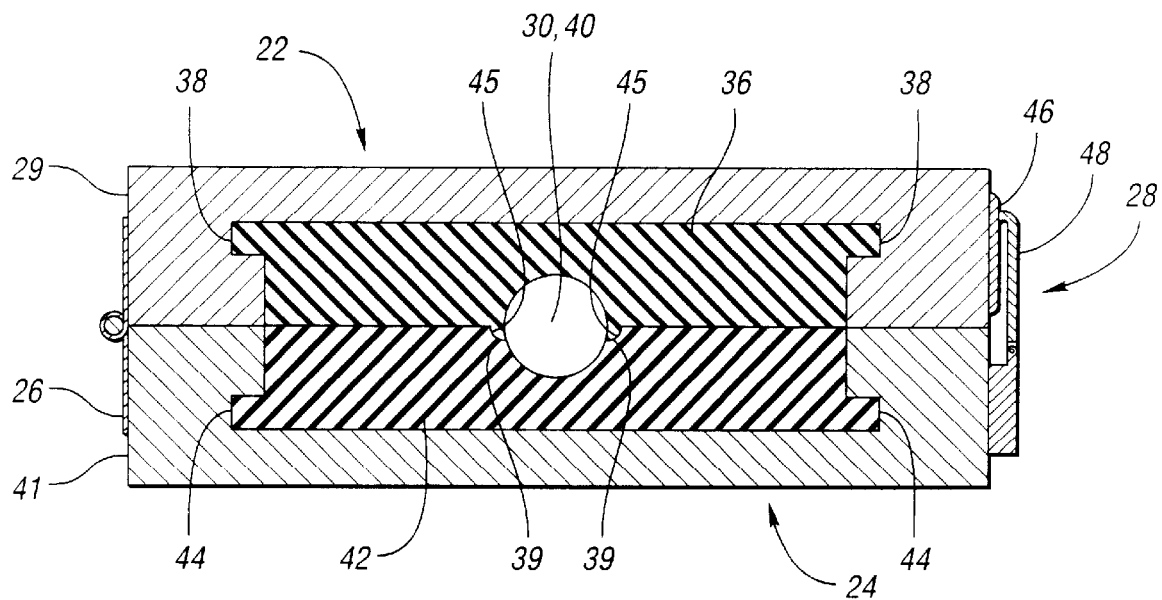
FIG. 2 is a cross-sectional view along line 2—2 of FIG. 1 showing the mold in a closed position.

Referring to FIGS. 1 and 2, a mold 20 for foaming around the wire harness 10 includes an upper first mold 22, a lower second mold 24, a hinge 26, and a latching mechanism 28.

The first mold 22 includes a first mold body 29, a cavity 30 formed therein, a bifurcated pour spout 32 in communication with the cavity 30, and an excess spout 34 in communication with the cavity. The cavity 30 is formed to approximate a mounting surface (not shown). Thus, the cavity shape will form a wire harness 10 which approximates the shape of the mounting surface. Both the pour spout 32 and the excess spout 34 act as conduits between the cavity 30 and the exterior of the first mold 22. The cavity 30 includes a rubber sealing means 36 formed therein.

The sealing means 36 includes end walls 37, protrusions 38, and locking ribs 39. The end walls 37 extend vertically away from the mold 22. The end walls 37 separate the cavity 30 into a foam receiving portion and a non-foam receiving portion.

The protrusions 38 are an integrally formed portion of the sealing means 36. One protrusion 38 is formed at each of the corners of the sealing means 36. These protrusions 38 fit within mating recesses (not shown) in the mold 22. These protrusions allow the sealing means 36 to be securely attached to the mold 22.

The perimeter of the sealing means 36 includes locking ribs 39 for assuring foam flash does not escape around the perimeter of the cavity 30.

The second mold 24 includes a second mold body 41, and a cavity 40 formed therein which is the mirror-image of the first mold cavity 30. The cavity 40 includes a rubber sealing means 42 formed therein.

The sealing means 42 includes end walls 43, protrusions 44, and grooves 45. The end walls 43 extend vertically away from the mold 24. The end walls 43 separate the cavity 40 into a foam receiving portion and a non-foam receiving portion.

The protrusions 44 are an integrally formed portion of the sealing means 42. One protrusion 44 is formed at each of the corners of the sealing means 42. These protrusions 44 fit within mating recesses (not shown) in the mold 24. These protrusions 44 allow the sealing means 42 to be securely attached to the mold 24.

The perimeter of the sealing means 42 includes grooves 45 for assuring foam flash does not escape around the perimeter of the cavity 40. These grooves 45 are configured to securely retain the locking ribs 39.

The hinge 26 joins the first and second mold halves 22 and 24 along one side. The hinge 26 is commercially available and allows the first mold 22 to be pivoted between an open position and a closed position.

The latching mechanism 28 is on the opposite side of the mold from the hinge 26. The latching mechanism 28 includes two spaced apart anchors 46 on the first mold 22, and a lockable pivoting hook 48 on the second mold 24. The latching mechanism 28 is commercially available and allows the mold halves to be releasably joined.

Recommended materials for the mold halves 22 and 24 include but are not limited to epoxy or machined aluminum. A recommended material for the sealing means 36 and 42 includes but is not limited to molded silicone.

Figure 3:
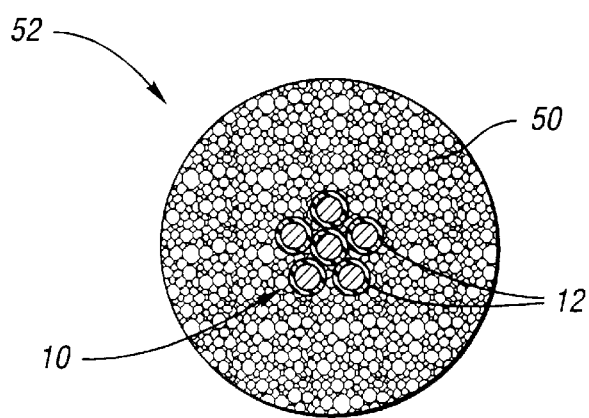
FIG. 3 is a cross-sectional view of the foamed-in wire harness formed from the method of the present invention.

Referring to FIGS. 1–3, the method for forming the wire harness 10 using the mold 20 will be discussed. A mold release may be applied to the sealing means 36 and 42 to prevent a foam 50 from sticking thereto. The mold 20 includes a cavity 30,40 shaped to approximate that of the mounting surface (not shown). While in the open position, the wire harness 10 is installed into the second mold cavity 40 against the sealing means 42.

The first mold 22 is pivoted from the open position to the closed position. The hooks 48 are engaged with the anchors 46 to securely close the mold 20. The ribs 39 and grooves 45 mate. The sealing means 36 and 42 are formed so that minimal foam flash is created at the intersection of the two mold halves 22 and 24. The wire harness 10 is surrounded with a pourable, expandable foam 50.

In this embodiment, each part of a two-part foam is poured into a separate branch of the bifurcated pour spout 32. The foam used is a two-part chemically reaction curing foam. Recommended polymer foams are commercially available urethane or polyethylene foams that are self-skinning and closed cell. However, it may be possible to use an open cell foam in certain applications. Any foam may be used that is pourable and expands upon entering the cavity 30, 40. Another recommended foam which can be injection molded or extruded is a commercially available thermoplastic urethane foam manufactured by BASF. If a memory retaining foam is desired, one recommended memory retaining foam is manufactured by BASF and sold under the trademark "ELASTOFLEX."

The foam 50 surrounds the wire harness 10 and expands within the cavity 30, 40. As the foam 50 expands it pushes on the locking ribs 39 causing the ribs to exert force on the grooves 45. Due to the configuration of the sealing means 36 and 42, the foam cannot escape around the perimeter of the cavity 30,40. Thus, excess foam must exit the cavity 30, 40 through the excess spout 34, this assures that the foam completely fills the cavity 30, 40 and releases pressure within the mold. The end walls 38, 44 of the sealing means prevent the foam from contacting the connectors 16. In another embodiment, the connectors 16 may be modified so that the foam can be molded around the connectors.

After the foam 50 expands within the cavity, it cures. Once the foam 50 cures, the wire harness 10 is removed from the cavity and packed for shipping. The result is a foamed-in wire harness 52 (as shown in FIG. 3). The foam 50 forms a sheath about the wires 12.

The principal advantage to the present invention is that foaming around a wire harness allows individual wires to be bundled in a way that protects the wires from mechanical wear and minimizes noises made by the harness due to vibration. Since the foam is less expensive than previously used protective materials and may be applied using automated methods, using foam substantially decreases the cost of forming wire harnesses as a result of cost savings for material and labor.

Yet another advantage of foaming in the wire harness using the present inventive method and wire harness is the wire harness may be molded to match the contoured mounting surface, such as the three-dimensional shape of an instrument panel to which it will be attached. If a memory foam is used, after compressing the wire harness into a container and shipping it, the wire harness upon removal from the container will return to its molded shape. This will make installation of the wire harness easier, since the wire harness will not need to be located and held prior to attachment to the instrument panel. The harness will simply exist in the shape it will assume on the instrument panel. If the foam is molded around fasteners as is the case here, the wire harness can be simply attached to holes in the instrument panel.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include, but are not limited to, modifying the cavity geometry so that grommets or other features can be foamed-in on the wire harness. Any type of wire harness can be foamed-in such as that for use on other mounting surfaces such as door panels, mirrors or aircraft bodies. In the case of an exterior mirror, the foamed-in wire harness may perform two roles. One of protecting a wire harness bundle for power mirrors and the like. The other of acting as a gasket. It is therefore contemplated that the appended claims will cover any such modification or embodiments that fall within the true scope of the invention.

We claim:

1. A method for forming a wire harness, the method comprising the steps of:

(a) shaping a cavity of a mold using a sealing means such that said cavity has a shape that approximates a mounting surface of a vehicle component;

(b) installing a wire harness into said cavity of said mold;

(c) surrounding said wire harness with foam; and (d) curing said foam about said wire harness.

2. The method of claim 1, wherein said foam is a pourable, expandable two-part chemically reaction curing foam, said method further including the step of allowing said foam to expand after said step (c).

3. The method of claim 1, wherein said foam is a urethane foam.

4. The method of claim 1, wherein said foam is a polyethylene foam.

5. The method of claim 1, wherein said foam is a shape memory retaining foam.

6. The method of claim 1, wherein said foam is thermoplastic urethane foam.

7. The method of claim 1 wherein step (c) comprises surrounding said wire harness with an open cell foam.

8. The method of claim 1 wherein said sealing means comprises at least one end wall for separating said cavity into a foam-receiving portion and a non-foam-receiving portion.

9. The method of claim 1 wherein said sealing means comprises first and second sealing means, said first sealing means having a rib, and said second sealing means having a groove for receiving said rib.

10. A wire harness adapted to be mounted adjacent a contoured surface of a vehicle component, said wire harness comprising:

a wire bundle; and a closed cell foam sheath molded around said bundle, said sheath having a shape matching that of the contoured surface; said sheath further having an elastic shape memory of said shape, rendering said sheath highly deformable and resilient to allow said sheath to be bent and to thereafter resiliently recover to said shape.

11. The wire harness of claim 10, wherein said foam is a two-part chemically reaction curing foam.

12. The wire harness of claim 10, wherein said foam is a urethane foam.

13. The wire harness of claim 10, wherein said foam is a polyethylene foam.

14. The wire harness of claim 10, wherein said foam is a shape memory retaining foam.

15. The wire harness of claim 10, wherein said foam is thermoplastic urethane foam.

16. The wire harness of claim 10 wherein said sheath extends continuously along substantially the entire length of said bundle.

17. A method for forming a wire harness, the method including the steps of:

(a) positioning a plurality of wires between first and second mold portions of a mold, said first and second mold portions having first and second mold bodies, respectively, and first and second sealing means, respectively, disposed adjacent said first and second mold bodies, respectively, said sealing means being cooperable to define a cavity;

(b) closing said mold such that said sealing means define said cavity;

(c) introducing a foamable polymer into said cavity; and (d) allowing said polymer to foam and expand in said cavity, thereby surrounding said plurality of wires.

18. The method of claim 17 further including the step of introducing a blowing agent into the cavity before said step (d).

19. The method of claim 17 further including the step of introducing a blowing agent into the resin before said step (d).

20. The method of claim 17 wherein said mold bodies have recesses, and said sealing means have protrusions engaged with said recesses.

21. The method of claim 17 wherein at least one of said sealing means includes an end wall for separating said cavity into a foam-receiving portion and a non-foam-receiving portion.

22. The method of claim 17 wherein one of said sealing means has a rib, and the other of said sealing means has a groove for receiving said rib, and said closing step comprises closing said mold such that said rib is received within said groove.

23. The method of claim 17 wherein said sealing means comprise silicone.

24. A method for forming a wire harness, the method including the steps of:

(a) positioning a plurality of wires between first and second mold portions of a mold, said first and second mold portions having first and second mold bodies, respectively, and first and second sealing means, respectively, engaged with said first and second mold bodies, respectively, said sealing means being cooperable to define a cavity having a shape corresponding to a mounting surface of a vehicle component, each of said sealing means having at least one end wall for separating said cavity into a foam-receiving portion and at least one non-foam-receiving portion, one of said sealing means having a rib, and the other of said sealing means having a groove for receiving said rib;

(b) closing said mold such that said first and second sealing means define said cavity, and such that said rib is received within said groove;

(c) introducing a foamable polymer into said cavity and around said plurality of wires;

(d) allowing said polymer to foam and expand around said plurality of wires, thereby surrounding said plurality of wires; and (e) curing said polymer about said plurality of wires.

25. A wire harness comprising:

a closed cell foam sheath having a molded shape matching that of a contoured surface of a vehicle component;

a plurality of bundled wires insert molded in said foam sheath; and at least one electrical connector connected to at least one of said plurality of bundled wires.

26. The wire harness of claim 25 wherein said sheath extends continuously along said plurality of bundled wires and has an elastic shape memory of said molded shape.

27. A wire harness comprising:

an open cell foam sheath having a molded shape matching that of a contoured surface of a vehicle component;

a plurality of bundled wires insert molded in said foam sheath; and at least one electrical connector connected to at least one of said plurality of bundled wires.

28. The wire harness of claim 27 wherein said sheath extends continuously along said plurality of bundled wires and has an elastic shape memory of said molded shape.

* * * * *